United States Patent [19]

DiMartini et al.

[11] 4,033,761

[45] July 5, 1977

[54] PROCESS FOR THE SEPARATION OF COPPER SULFIDE FROM METALLIC LEAD ENTRAINED IN A DROSS

[75] Inventors: Carl Richard DiMartini, Piscataway; William Lafayette Scott, Lebanon; Leo James Bulvanoski, Fords, all of N.J.

[73] Assignee: Asarco Incorporated, New York, N.Y.

[22] Filed: May 10, 1976

[21] Appl. No.: 684,802

[52] U.S. Cl. .................................. 75/77; 75/63
[51] Int. Cl.² ................................... C22B 13/02
[58] Field of Search ............................ 75/63, 77

[56] References Cited

UNITED STATES PATENTS

| | | | |
|---|---|---|---|
| 1,098,854 | 6/1914 | Thum | 75/63 X |
| 1,175,266 | 3/1916 | Hybinette | 75/77 X |
| 1,425,701 | 8/1922 | Sem | 75/63 |
| 2,343,761 | 3/1944 | Fleming et al. | 75/77 X |
| 2,381,970 | 8/1945 | Collins | 75/77 X |
| 2,512,578 | 6/1950 | Jordan | 75/63 X |
| 3,666,441 | 5/1972 | Milner | 75/63 X |

Primary Examiner—L. Dewayne Rutledge
Assistant Examiner—E. L. Weise
Attorney, Agent, or Firm—R. J. Drew; E. J. Schaffer

[57] ABSTRACT

Copper sulfide in the presence or absence of metallic copper contained in a dross obtained from the copper drossing of lead bullion is separated from metallic lead entrained or occluded in the dross by introducing the dross into a vessel other than a reverberatory furnace, usually a kettle, also introducing an alkali metal sulfide, preferably sodium sulfide, into the kettle, and heating the dross and alkali metal sulfide together in the kettle at an elevated temperature not in excess of 1200° F. and for a time sufficient to melt together the dross and alkali metal sulfide. The thus-obtained molten dross releases the entrained molten lead which falls to the bottom of the kettle. The molten dross and molten alkali metal sulfide form a low melting copper sulfide-alkali metal sulfide matte on the surface of the resulting pool of the released molten lead, and the matte is separated from the molten lead pool, for instance by being lifted off the pool by means of a hook positioned in the matte layer while molten and retained in the matte layer while the matte layer is permitted to solidify on the molten lead pool surface.

Copper sulfide in the presence of metallic copper can also be separated from metallic lead and tin contained in solder drosses, e.g. high tin-bearing solder drosses, or in other drosses in accordance with this invention.

10 Claims, 2 Drawing Figures

PROCESS FOR THE SEPARATION OF COPPER SULFIDE FROM METALLIC LEAD ENTRAINED IN A DROSS

BACKGROUND OF THE INVENTION

1. Statement of the Invention

This invention relates to the treatment of metal drosses, and more particularly to a new and improved process for separating copper sulfide in the presence or absence of metallic copper from a lead-containing dross wherein relatively low melting temperatures are utilized and a relatively economical and simple-to-operate kettle or similar vessel is employed instead of an expensive, relatively complicated reverberatory furnace.

2. Description of the Prior Art.

U.S. Pat. No. 2,217,981 relates to separating copper from dross containing copper and lead and obtained from the de-copperizing of lead bullion involving charging the dross to a reverberatory furnace, and heating the dross to about 2000° F. to melt the dross. The dross is maintained at about 2000° for 1 hour, after which the fusion products are tapped from the furnace. Metallic lead is thereby liberated and a separate matte phase and dross are formed, the matte phase containing copper sulfide and the dross containing sodium sulfide and a trace of lead. U.S. Pat. No. 1,931,285 relates to treatment of drosses obtained from the melting of lead and lead-bearing alloys, and involving subjecting the dross to prolonged agitation with the molten metal, until the dross releases the metal entrained therewith and becomes dry and of low entrained metal content.

Dross obtained from the copper drossing of lead bullion contains considerable metallic lead entrained in the dross, in addition to copper sulfide. The copper sulfide-containing dross is usually destined for the copper smelter, and it is desirable to separate the copper sulfide of the dross from a major portion, at least, of the metallic lead prior to transferring the copper sulfide-containing dross to to the smelting furnace. The separated metallic lead is sent to the lead refinery for further refining.

BRIEF SUMMARY OF THE INVENTION

The process of the present invention comprises introducing the dross comprising copper sulfide in the presence or absence of metallic copper, and metallic lead entrained or occluded in the dross, for example a dross obtained from the copper drossing of lead bullion, into a suitable vessel other than a reverberatory furnace, usually a kettle, and introducing an alkali metal sulfide into the vessel. The resulting admixture of dross and alkali metal sulfide is heated in the vessel at an elevated temperature not in excess of 1200° F. and for a time sufficient to melt together the dross and alkali metal sulfide, and the molten dross releases the entrained molten metallic lead. The molten copper sulfide and, when present, metallic copper of the molten dross and the molten alkali metal sulfide form a low melting copper sulfide-alkali metal sulfide matte layer on the top surface of a pool of the release molten lead, and the copper sulfide-alkali metal sulfide matte is separated from the molten lead pool.

The relatively low temperature, kettle process of the present invention is a considerable improvement over the prior art high temperature, reverberatory furnace process of the prior art and disclosed in U.S. Pat No. 2,217,981 for the reasons the process of the present invention is considerably more economical, efficient and simpler than the prior art process of U.S. Pat No. 2,217,981 .

It is critical that the solid dross comprising copper sulfide and, when present, metallic copper, and metallic lead and the alkali metal sulfide be heated for melting while together, i.e., in the presence of each other, inasmuch as only when such dross and the alkali metal sulfide are heated in the presence of each other will they melt together at a relatively low temperature not in excess of 1200° F. When such dross is heated separately and not in the presence of the alkali metal sulfide, the copper sulfide of the dross will only melt if the dross is heated at a high temperature, say in excess of 2000° F. The alkali metal sulfide such as sodium sulfide will only melt when heated separately, i.e., not in the present of the dross, at relatively high temperature, for instance in excess of 2200° F. It is necessary that the heating temperature for melting the dross and alkali metal sulfide not exceed 1200° F., inasmuch as the melting of such materials is usually carried out in a kettle in the lead refinery and the kettle, which is fabricated of cast iron, cannot withstand temperatures much in excess of 1200° F. without being attacked and detrimentally affected due to corrosion, warping, etc.

In one embodiment of the invention, copper sulfide and, when present, metallic copper is separated from metallic lead contained in a dross obtained from the rough copper drossing of lead bullion.

In accordance with another embodiment, copper sulfide and, when present, metallic copper is separated from metallic lead contained in a solder dross. The solder dross may also contain tin.

Alkali metal sulfides utilizable herein are sodium sulfide, potassium sulfide and lithium sulfide.

DETAILED DESCRIPTION OF THE DRAWINGS

Figure 1:
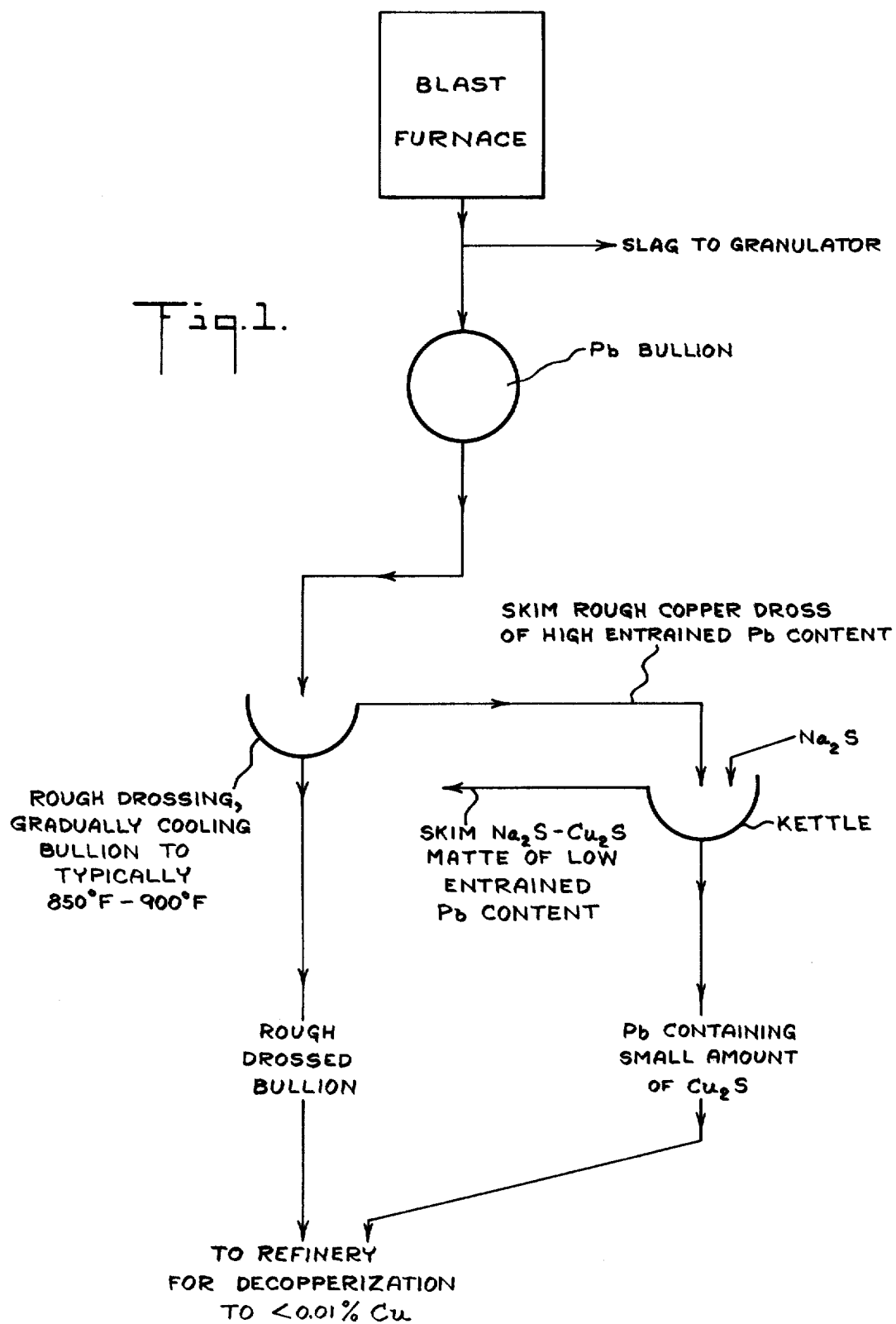
FIG. 1 is a flow sheet of one embodiment of the present invention.

With reference to FIG. 1, molten lead bullion is tapped from the blast furnace and the slag which is separated from the molten bullion, is passed to the granulator. The molten bullion, which contains typically about 1.0% Cu and about 0.2% S and is at a temperature of typically about 1700° F. is transferred in a ladle by a crane to a drossing kettle wherein the bullion is liquated to separate out a copper sulfide-and metallic lead-containing rough dross on the surface of the molten lead bullion. During the conventional liquation in the rough copper drossing kettle, the molten bullion is gradually cooled to a temperature in the range of typically 850° F. to 900° F. The resulting rough-drossed bullion containing typically about 0.1% Cu and about 0.003% S is transferred to the lead refinery for further purification of the lead including de-copperizing the lead to <0.01% copper content. The copper sulfide-and metallic lead-containing rough dross is skimmed from the surface of the molten bullion in the kettle and typically about 30 tons of such rough dross containing typically about 15% Cu and about 3% S is transferred to a separate kettle.

Sodium sulfide in amount of typically 4.5 tons is added to the copper sulfide-and metallic lead-containing rough dross in the last-mentioned kettle, and the sodium sulfide and rough dross are heated together at a relatively low temperature therein, which is a sufficiently elevated temperature to cause these materials to melt together. The sodium sulfide and rough dross are heated in such kettle to a temperature typically in the range of about 1000° F. to about 1100° F. Alternatively, instead of adding sodium sulfide per se to the kettle, the sodium sulfide can be formed therein in situ by adding NaHS and caustic soda to the kettle. When commercial sodium sulfide which contains some water is preferably first added to a low heated kettle at a temperature of say, 400° F. to dehydrate the $Na_2S$. The sodium sulfide and copper sulfide of the melted-together sodium sulfide and rough dross form a low melting, copper sulfide-sodium sulfide matte, and consequently the metallic lead is released from its entrained state in the rough dross and the freed metallic lead falls to the bottom of the kettle, and the copper sulfide-sodium sulfide matte phase forms a layer on the top surface of this released metallic lead. The result is two immiscible phases, one the upper layer of copper sulfide-sodium sulfide matte phase on the surface of the liberated molten metallic lead, and the second the pool of metallic lead which has been released from the dross. The copper sulfide-sodium sulfide matte phase layer contains typically about 30% Cu, about 13% S and about 14% Pb, and typically about 10 tons of such copper sulfide-sodium sulfide matte phase is separated from the molten pool of liberated lead, and shipped to the copper smelter. Liberated lead in amount of typically about 20 tons and containing typically about 0.2% Cu and about 0.005% S is transferred to the lead refinery for further purification including decopperizing to typically <0.1% Cu content.

Figure 2:
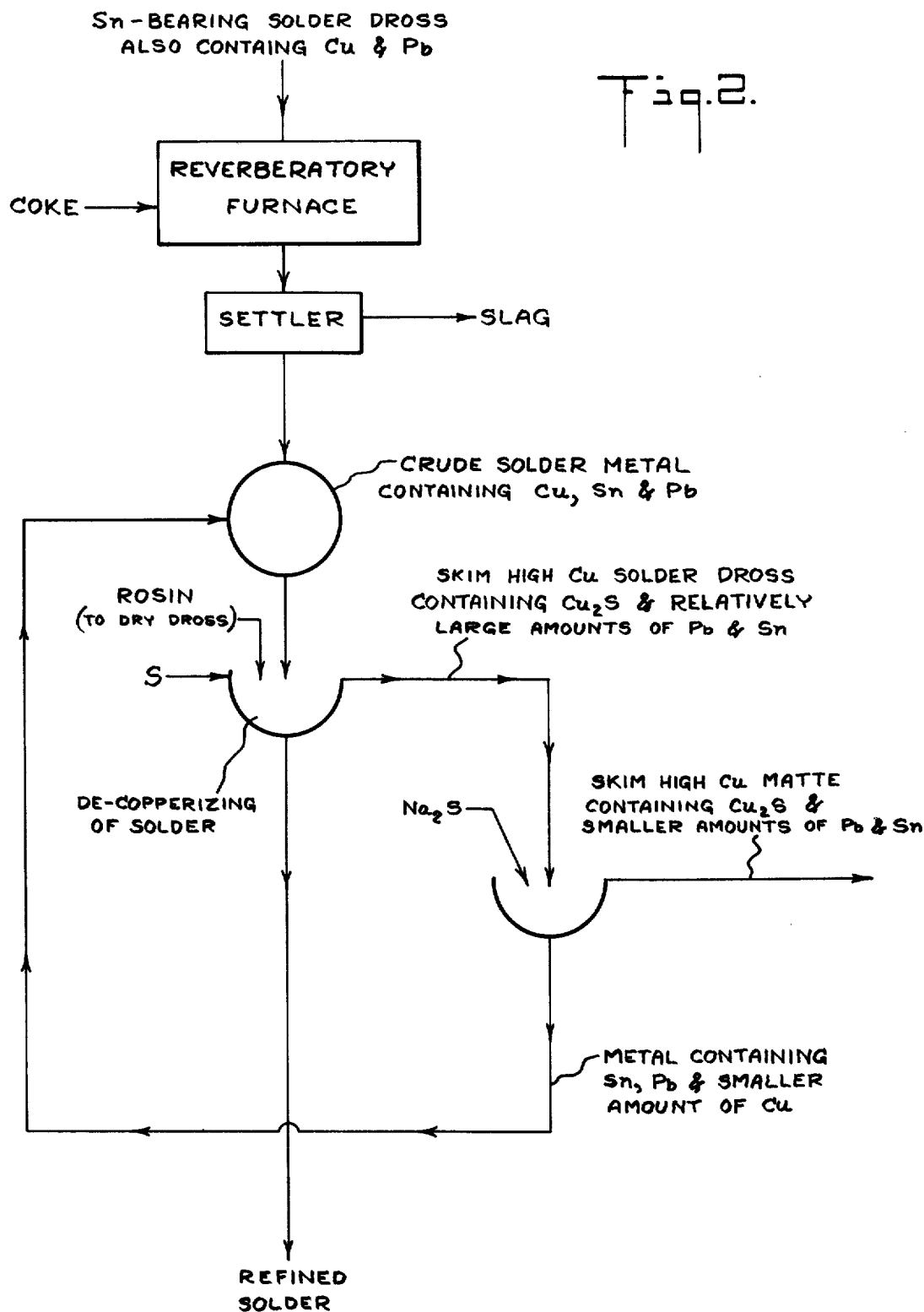
FIG. 2 is a flow sheet of another embodiment of the present invention.

Referring to FIG. 2, a tin-and copper bearing solder dross containing typically about 20% Sn, about 50% Pb and about 1.5% Cu is charged into a reverberatory furnace and smelted therein with carbonaceous reducing agent, such as coke. The crude solder from the smelting furnace is separated from the slag is a settler in known manner. The separated molten crude solder metal at temperature of typically about 700° F. and containing typically about 30% Sn, about 65% Pb and about 1.5% Cu is transferred in a ladle by a crane to a kettle for de-copperizing of the solder. Sulfur is added to the solder metal in the kettle in known manner to form copper sulfide which reports in a high copper-content solder dross which forms on the surface of molten solder metal. Rosin is usually added to the solder dross on the molten solder metal surface to "dry" the dross in known manner.

The solder dross, which contains copper sulfide and relatively large amounts of lead and tin, typically about 25% Cu, about 20% Sn and about 45% Pb, is skimmed from the surface of the molten solder metal in the kettle and transferred to a separate kettle.

Sodium sulfide in amount of typically 2 tons is added to the copper sulfide-, lead-and tin-containing solder dross in the last-mentioned kettle, and the sodium sulfide and solder dross are heated together at a relatively low temperature therein, typically in the range of about 1000° F. to about 1200° F., which is a sufficiently elevated temperature to cause these materials to melt together. The sodium sulfide and copper sulfide of the melted together sodium sulfide and solder dross form a low melting copper sulfide-sodium sulfide matte and, as a result, the metallic lead and tin are freed from its occluded state in the dross and the liberated metallic lead-tin alloy fall to the bottom of the kettle, whereas the copper sulfide-sodium sulfide matte phase forms a layer on the top surface of the liberated molten metallic lead and tin. The copper sulfide-sodium sulfide matte phase layer contains copper sulfide and smaller amounts of lead and tin, typically about 35% Cu as copper sulfide, about 15% Pb and about 15% Sn, and typically about 6 tons of such copper sulfide-sodium sulfide matte phase are skimmed from the surface of the molten lead and tin. This matte phase is shipped to a smelter. Molten metal comprising metallic tin and metallic lead and a smaller amount of copper is withdrawn from the molten metal pool in the last-mentioned kettle and returned for introduction ultimately into the decopperizing kettle. Refined molten solder is withdrawn from the pool of metallic solder in the decopperizing kettle for casting into the desired shape.

DESCRIPTION OF THE PREFERRED EMBODIMENTS

The preferred alkali metal sulfide is sodium sulfide.

The following examples further illustrate the invention. Percentages are by weight in such examples.

EXAMPLE 1

Twenty-four hundred (2400) lbs. of sodium sulfide containing 40% water was introduced incrementally into a kettle, and heated therein to 400° F. to expel the water from the sodium sulfide. Approximately 7400 lbs. of dross obtained from the copper drossing of lead bullion was then added to the sodium sulfide in the kettle and heated to 1100° F. The dross contained Pb 76.5%, Cu 12.5%, S 2.5%, Fe 0.8%, Zn 1.3%, Ni 0.2%, Sb 0.2%, As 0.2%, and Ag in amount of 21.7 oz./ton. The sodium sulfide and the dross melted together during the heating at 1100° F., and the molten dross released molten metallic lead which was entrained in the dross. The released molten lead dropped down to form a pool of molten lead in the kettle, and a copper sulfide-sodium sulfide matte layer formed on the surface of the molten lead pool. Approximately 7400 lbs. of dross obtained from the copper drossing of lead bullion and of the same composition as that of the dross first-referred to in this Example 1 was then added to the contents of the kettle, and permitted to dissolve in the matte layer. The matte layer was then skimmed from the surface of the molten lead pool. The total skimmed matte weighted about 5490 lbs., and this matte had the following composition: Pb 14.8%, Cu 30.2%, S 20.4%, Na 12.2%, Fe 3.4%, Zn 2.5%, Ni 0.5%, As 0.5%, Sb 0.5% and Ag in the amount of 2.9 oz./ton. The metallic lead of the pool, which totalled 10,695 lbs., had the following composition: Cu 0.49%, Sb 0.003%, As <0.005%, Ni 0.01%, Fe <0.0005%, Zn <0.005% and Ag in amount of 28.8 oz./ton.

EXAMPLE 2

Twelve-hundred (1200) lbs. of NaOH was introduced into a kettle and melted therein. Twelve-hundred (1200) lbs. of sodim hydrosulfide (NahS) containing 26% water was introduced incrementally into the molten NaOH in the kettle and the resulting mass heated therein to about 500° F. As a result, the water was evolved from the sodium hydrosulfide and sodium sulfide was formed in situ in the kettle. Approximately 6700 lbs. of dross obtained from the copper drossing of lead bullion was then added to the contents in the kettle and heated to 1100° F. The dross contained: Pb 76.5%, Cu 12.5%, S 2.5%, Fe 0.8%, Zn 1.3%, Ni 0.2%, Sb 0.2%, As 0.2% and Ag in amount of 21.7 oz./ton. The dross was melted in the presence of the sodium sulfide during the heating at 1100° F., and the molten dross released molten metallic lead which was entrained in the dross. The released molten lead dropped down to form a pool of molten lead in the kettle, and a copper sulfide-sodium sulfide matte layer formed on the surface of the molten lead pool. Approximately 6700 lbs. of dross obtained from the copper drossing of lead bullion and of the same composition as that of the dross first-referred to in this Example 2 was then added to the contents of the kettle and permitted to dissolve in the matte layer while stirring the contents of the kettle. The matte layer was then skimmed from the surface of the molten lead pool The total skimmed matte weighted about 4832 lbs., and had the following composition: Pb 12.9%, Cu 33.6%, S 16.3%, Na 13.4%, Fe 2.9%, Zn 4.3%., Ni 0.5%, As 0.5%, Sb 0.5% and Ag in amount of 2.3 oz./ton. The metallic lead of the pool, which totalled 9871 lbs., had the following composition: Cu 2.04%, Sb 0.003%, As <0.005%, Ni 0.01%, Fe <0.0005%, Zn <0.005% and Ag in amount of 29.2 oz./ton.

EXAMPLE 3

Four-thousand (4000) lbs. of sodium sulfide containing 40% water was introduced incrementally into a kettle and heated therein to 400° F. to expel the water from the sodium sulfide. A tin-and copper-bearing solder dross in amount of 20,485 lbs. was then added to the sodium sulfide in the kettle and heated to 1100° F. The dross contained: Cu 26.7%, Sn 21.0%, pb 30.0% and S 10.0%. The sodium sulfide and dross melted together during the heating at 1100° F., and the molten dross released metallic lead and metallic tin which was entrained in the dross. The released molten lead and molten tin dropped down to form a pool of molten lead and tin in the kettle, and a copper sulfide-sodium sulfide matte layer formed on the surface of the molten metal pool The matte layer was then skimmed from the surface of the molten metal pool. The skimmed matte weighted 12,600 lbs. and had the following composition: Cu 30.5%, Sn 12.2%, Pb 5.4% and S 16.5%. The molten metal of the pool, which weighed 11,240 lbs., had the following composition: Cu 11.8%, SN 32.1%, Pb 54.3% and S 0.04%.

What is claimed is:

1. A process for the separation of copper sulfide and, when present, metallic copper, from metallic lead entrained in a dross which comprises introducing the dross comprising copper sulfide and, when present, metallic copper, and metallic lead entrained therein into a vessel, introducing an alkali metal sulfide into said vessel, heating the resulting admixture of dross and alkali metal sulfide therein at an elevated temperature and for a time sufficient to melt together the dross and alkali metal sulfide, the molten dross releasing the entrained molten metallic lead, and molten copper sulfide of the molten dross and the molten alkali metal sulfide forming a low melting copper sulfide-alkali metal sulfide matte layer on the surface of a pool of the released molten lead, and separating the matte from the molten lead pool.

2. The process of claim 1 wherein the dross and alkali metal sulfide are heated together at a temperature not in excess of 1200° F. to fuse together the dross and alkali metal sulfide.

3. The process of claim 2 wherein the solid dross and alkali metal sulfide are brought together in a kettle and heated therein to melt the dross and alkali metal sulfide.

4. the process of claim 2 wherein the alkali metal sulfide is sodium sulfide.

5. The process of claim 2 wherein the metallic lead is entrained in the dross introduced into the vessel in larger amount than the copper sulfide, and the metallic lead is present in the matte phase in smaller amount than the copper sulfide.

6. The process of claim 3 wherein the metallic lead is entrained in the dross introduced into the vessel in larger amount than the copper sulfide, and the metallic lead is present in the matte phase in smaller amount than the copper sulfide.

7. The process of claim 2 wherein the dross is a copper sulfide-and metallic lead-containing dross obtained from the copper drossing of lead bullion.

8. The process of claim 3 wherein the dross is a copper sulfide-and metallic lead-containing dross obtained from the copper drossing of lead bullion.

9. The process of claim 2 wherein the dross is a copper sulfide-and metallic lead-containing solder dross.

10. The process of claim 9 wherein the solder dross also contains tin.

* * * * *